(12) United States Patent
Nishida et al.

(10) Patent No.: US 10,794,466 B2
(45) Date of Patent: Oct. 6, 2020

(54) PLANETARY GEAR DEVICE

(71) Applicant: KAWASAKI JUKOGYO KABUSHIKI KAISHA, Kobe-shi, Hyogo (JP)

(72) Inventors: Takunobu Nishida, Kobe (JP); Hirofumi Akahori, Akashi (JP); Mamoru Yoshitomi, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 55 days.

(21) Appl. No.: 16/324,361

(22) PCT Filed: Aug. 1, 2017

(86) PCT No.: PCT/JP2017/027911
§ 371 (c)(1),
(2) Date: Feb. 8, 2019

(87) PCT Pub. No.: WO2018/030221
PCT Pub. Date: Feb. 15, 2018

(65) Prior Publication Data
US 2019/0170242 A1      Jun. 6, 2019

(30) Foreign Application Priority Data

Aug. 10, 2016  (JP) .................. 2016-157892

(51) Int. Cl.
*F16H 57/04*      (2010.01)
*F16H 1/28*       (2006.01)

(52) U.S. Cl.
CPC ........... *F16H 57/0427* (2013.01); *F16H 1/28* (2013.01); *F16H 57/04* (2013.01);
(Continued)

(58) Field of Classification Search
CPC .. F16H 57/0427; F16H 57/04; F16H 57/0457; F16H 57/0479; F16H 57/0482;
(Continued)

(56) References Cited

U.S. PATENT DOCUMENTS

2010/0236347 A1    9/2010 Kuwamoto et al.
2012/0238401 A1    9/2012 McCune et al.
(Continued)

FOREIGN PATENT DOCUMENTS

JP     2009-008123 A    1/2009
JP     2011-220496 A    11/2011
(Continued)

*Primary Examiner* — Jacob S. Scott
*Assistant Examiner* — Lori Wu
(74) *Attorney, Agent, or Firm* — Sughrue Mion, PLLC (57) ABSTRACT

A planetary gear device includes a sun gear; a plurality of planetary gears; a planetary carrier at which the plurality of planetary gears are rotatably provided; and a ring gear, wherein the planetary carrier includes an oil feeding passage which feeds lubricating oil to at least one of the plurality of planetary gears, wherein the ring gear is a double helical gear in which a pair of rows of internal teeth are arranged in a direction of an axis line of the ring gear and the internal teeth of one of the rows and the internal teeth of the other of the rows are inclined in different directions, the ring gear including at least one discharge passage, wherein the at least one discharge passage includes an inlet-side portion and an outlet-side portion, the inlet-side portion being closer to an inlet configured to open in a region between the pair of rows of internal teeth at an inner peripheral surface of the ring gear, and the outlet-side portion being closer to an outlet configured to open in a region of an outer peripheral surface of the ring gear, and wherein the inlet-side portion is formed at the ring gear so that the inlet-side portion is inclined in a
(Continued)

rotation direction of the planetary carrier, with respect to a reference line extending in a radial direction of the ring gear.

7 Claims, 6 Drawing Sheets

(52) U.S. Cl.
CPC ..... *F16H 57/0457* (2013.01); *F16H 57/0479* (2013.01); *F16H 57/0482* (2013.01)

(58) Field of Classification Search
CPC ............. F16H 57/0424; F16H 57/0486; F16H 57/0428; F16H 1/28; F16H 2055/176
See application file for complete search history.

(56) References Cited

U.S. PATENT DOCUMENTS

2013/0095974 A1 4/2013 Imai et al.
2016/0290492 A1 10/2016 Hattori et al.

FOREIGN PATENT DOCUMENTS

PLANETARY GEAR DEVICE

CROSS REFERENCE TO RELATED APPLICATIONS

This application is a National Stage of International Application No. PCT/JP2017/027911 filed Aug. 1, 2017, claiming priority based on Japanese Patent Application No. 2016-157892, filed Aug. 10, 2016.

TECHNICAL FIELD

The present invention relates to a planetary gear device including a double helical ring gear.

BACKGROUND ART

In an aircraft or the like, a planetary gear device is used as a driving force transmission mechanism. As planetary gears of this planetary gear device, double helical gears are used to cancel out an axial load. As such a planetary gear device, for example, a planetary gear device disclosed in Patent Literature 1 is known.

In the planetary gear device disclosed in Patent Literature 1, lubricating oil is led to the inner peripheral surface of a ring gear by a flow generated by the rotation of the planetary gears. Rows of double helical gear teeth (opposed helix angle gear teeth) are formed at the inner peripheral surface of the ring gear, as in the planetary gears. The double helical gear teeth consist of two teeth slanted in different directions. While the planetary gears are revolving, lubricating oil flows to the outer side and inner side of the double helical gear teeth according to the direction of the revolution of the planetary gears. In the inner peripheral surface of the ring gear, an annular groove is formed in a region between the two teeth forming the double helical gear teeth. When the lubricating oil flows to the inner side of the double helical gear teeth, the lubricating oil is reserved in the annular groove. In a case where the planetary gears continue to rotate in the same direction, a state in which the lubricating oil is reserved in the annular groove is maintained. When the planetary gears stir the lubricating oil reserved in the annular groove, a churning loss is generated. To suppress this churning loss, in the planetary gear device disclosed in Patent Literature 1, the ring gear is provided with a plurality of discharge passages. The discharge passages extend in the radial direction of the ring gear. Through the discharge passages, the lubricating oil reserved in the annular groove is discharged to an outside region of the ring gear.

CITATION LIST

Patent Literature

Japanese Laid-Open Patent Application Publication No. 2011-220496

SUMMARY OF INVENTION

Technical Problem

Regarding the planetary gear device disclosed in Patent Literature 1, a case where the ring gear is unrotatable with respect to the sun gear (namely, planetary gear device), and a case where the ring gear is rotatable around the sun gear (namely, star-type gear device) are described. In the case of the star-type gear device, a centrifugal force generated due to the rotation of the ring gear works on the lubricating oil led to the ring gear. By this centrifugal force, the lubricating oil reserved in the annular groove is pushed into the discharge passages, and discharged to an outside region of the ring gear through the discharge passages.

In contrast, in the case of the planetary gear device, the centrifugal force does not work on the lubricating oil led to the ring gear. For this reason, the lubricating oil in the annular groove cannot be pushed into the discharge passages, and tends to be reserved in the inner peripheral surface of the ring gear. Thus, a function of suppressing the churning loss, of the planetary gear device, is lower than that of the star-type gear device.

In view of the above-described circumstances, an object of the present invention is to provide a planetary gear device which is capable of improving a function of suppressing a churning loss.

Solution to Problem

A planetary gear device of the present invention comprises a sun gear having a row of external teeth; a plurality of planetary gears disposed around the sun gear, each of the plurality of planetary gears having a row of external teeth which mesh with the external teeth of the sun gear; a planetary carrier at which the plurality of planetary gears are rotatably provided, the planetary carrier being rotatable around the sun gear together with the plurality of planetary gears; and a ring gear having a pair of rows of internal teeth which mesh with the external teeth of the plurality of planetary gears, the plurality of planetary gears being arranged inward of the ring gear, wherein the planetary carrier includes an oil feeding passage which feeds lubricating oil to at least one of the plurality of planetary gears, wherein the ring gear is a double helical gear in which the pair of rows of internal teeth are arranged in a direction of an axis line of the ring gear and the internal teeth of one of the rows and the internal teeth of the other of the rows are inclined in different directions, the ring gear including at least one discharge passage, wherein the at least one discharge passage includes an inlet-side portion and an outlet-side portion, the inlet-side portion being closer to an inlet configured to open in a region between the pair of rows of internal teeth at an inner peripheral surface of the ring gear, and the outlet-side portion being closer to an outlet configured to open in a region of an outer peripheral surface of the ring gear, and wherein the inlet-side portion is formed at the ring gear so that the inlet-side portion is inclined in a rotation direction of the planetary carrier, with respect to a reference line extending in a radial direction of the ring gear.

In accordance with the present invention, the lubricating oil given from the oil feeding passage flows along the planetary gears and is led to the region between the pair of rows of internal teeth of the ring gear. Since the plurality of planetary gears rotate around the sun gear together with the planetary carrier, the lubricating oil flows in the same direction as the rotation direction of the planetary carrier, along the inner peripheral surface of the ring gear. The ring gear is provided with the plurality of discharge passages. The inlet of each of the plurality of discharge passages opens in the region between the pair of rows of internal teeth. The discharge passage is inclined in the rotation direction of the planetary carrier. The lubricating oil flowing along the inner peripheral surface of the ring gear can be pushed into the inlet by a force of the flowing lubricating oil. Thus, it becomes possible to discharge more lubricating oil to an outside region of the ring gear, compared to the conventional planetary gear device in which the discharge passages extend straightly in the radial direction. This makes it possible to prevent a situation in which the lubricating oil is reserved in the inner peripheral surface of the ring gear, and to improve a function of suppressing a churning loss.

In the above-described invention, the inlet-side portion may extend in the same direction as a tangential direction of the inner peripheral surface of the ring gear.

In accordance with the present invention, the inlet-side portion is smoothly connected to the inner peripheral surface of the ring gear. This allows the lubricating oil flowing along the inner peripheral surface of the ring gear to directly flow to the inlet-side portion. Thus, more lubricating oil can be flowed into each of the discharge passages, compared to the conventional planetary gear device in which the discharge passages extend straightly in the radial direction. This makes it possible to more effectively prevent a situation in which the lubricating oil is reserved in the inner peripheral surface of the ring gear.

In the above-described invention, the outlet-side portion may be formed at the ring gear so that the outlet-side portion is inclined to a first side in a circumferential direction of the ring gear, with respect to the reference line extending in the radial direction of the ring gear.

In accordance with the present invention, in a case where a swirl flow swirling to the first side in the circumferential direction is generated in an outside region of the ring gear, the lubricating oil can be drawn out through the outlet by the swirl flow. Thus, it becomes possible to discharge more lubricating oil to an outside region of the ring gear, compared to the conventional planetary gear device in which the discharge passages extend straightly in the radial direction.

In the above-described invention, the at least one discharge passage may be formed in a curved shape at the ring gear.

In accordance with the present invention, the length of the passage can be reduced, compared to a case where the discharge passage has a linear (straight-line) shape and is inclined. This makes the passage resistance of the discharge passage lower than that in the above case.

In the above-described invention, the at least one discharge passage may include a plurality of discharge passages, the ring gear may include a flange formed over an entire periphery in a circumferential direction, the flange protruding radially outward, the flange may be fastened to a casing by a plurality of fastening members, the plurality of discharge passages may be formed at the flange so that the plurality of discharge passages are spaced apart from each other, and each of the plurality of fastening members may be provided between two adjacent discharge passages.

In accordance with the present invention, the number of discharge passages can be increased while ensuring a space formed between the two adjacent discharge passages. Thus, the number of fastening members disposed between the two adjacent discharge passages can be increased. As a result, a force for fastening the ring gear to the casing can be increased.

In the above-described invention, the ring gear may include a pair of helical gears including the pair of rows of internal teeth, the pair of helical gears may include joined surfaces which are joined to each other to form the ring gear, and discharge grooves facing each other are formed at the joined surfaces, respectively, and the at least one discharge passage may be formed by butting the discharge grooves to each other.

In accordance with the present invention, the discharge passage can be designed more flexibly.

Advantageous Effects of Invention

In accordance with the present invention, in the planetary gear device, a function of suppressing a churning loss can be improved.

The above and further objects, features and advantages of the present invention will more fully be apparent from the following detailed description of preferred embodiment with reference to the accompanying drawings.

DESCRIPTION OF EMBODIMENTS

Hereinafter, planetary gear devices (hereinafter will be simply referred to as "planetary gear devices") 1, 1A, 1B according to Embodiment 1, Embodiment 2, and Embodiment 3 of the present invention will be described with reference to the drawings. The stated directions are used for easier understanding and are not intended to limit the directions of constituents of the invention. The planetary gear devices 1, 1A, 1B described below are merely the embodiments of the present invention. Therefore, the present invention is not limited to the embodiments, and addition, deletion, and change can be made within the scope of the invention.

Embodiment 1

Figure 1:
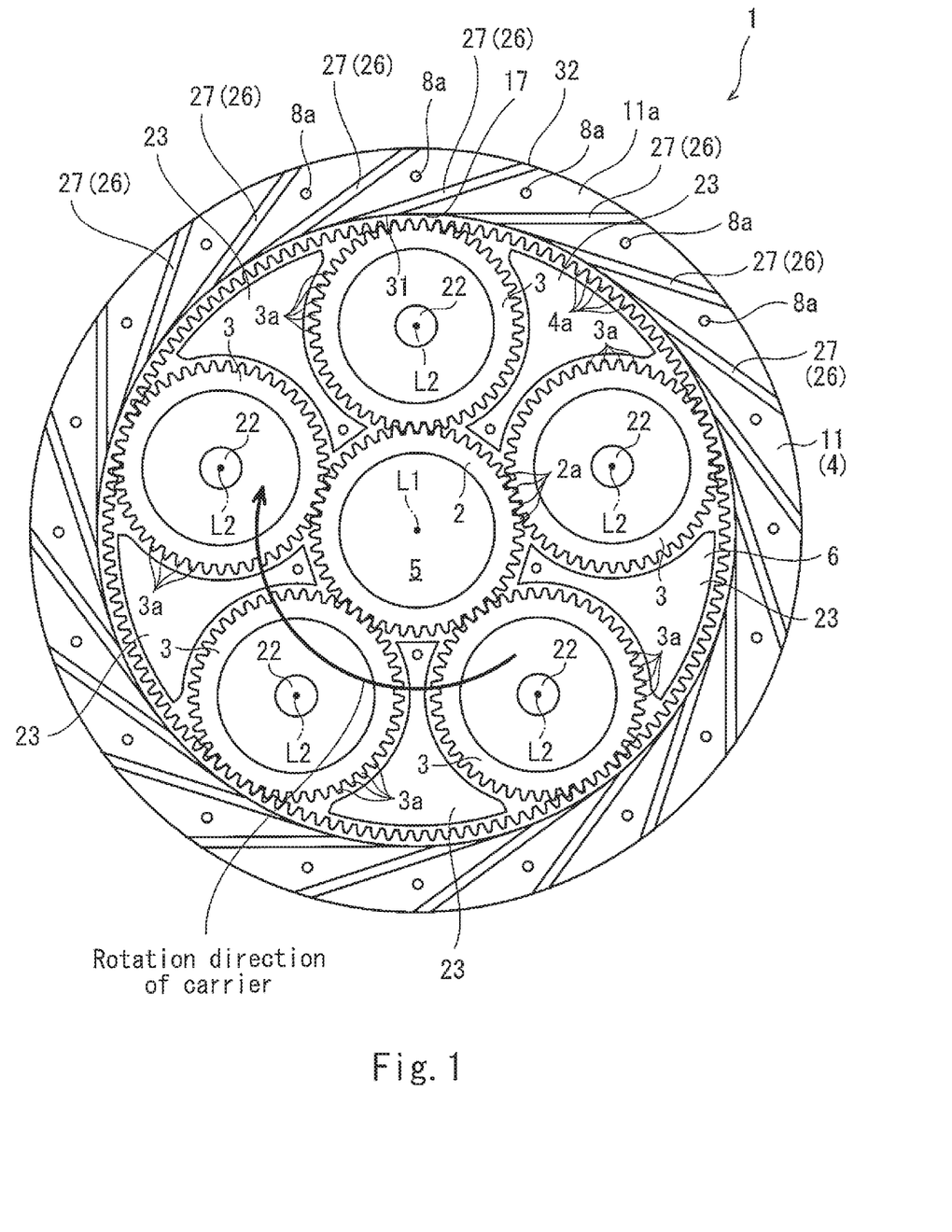
FIG. 1 is a cross-sectional view of a planetary gear device according to Embodiment 1 of the present invention, which is viewed in a direction of an axis line.

As an example of the planetary gear device 1 of FIG. 1, there is a planetary gear device. The planetary gear device 1 is used in, for example, a driving force transmission mechanism (speed reducer mechanism) of an aircraft engine. Note that the planetary gear device 1 need not be provided at the driving force transmission mechanism of the aircraft engine, and may be provided at other driving force transmission mechanisms or devices. The planetary gear device 1 includes a sun gear 2, a plurality of planetary gears 3, a ring gear 4, and a planetary carrier 6. The sun gear 2 is a double helical gear. The sun gear 2 includes a pair of rows of external teeth 2a forming double helical gear teeth (opposed helix angle gear teeth). The sun gear 2 is fitted to the outer peripheral surface of an input shaft 5 so that the sun gear 2 is unrotatable relative to the input shaft 5. The plurality of (five in the present embodiment) planetary gears 3 are arranged around the sun gear 2.

The plurality of planetary gears 3 are arranged to be equally spaced apart from each other (positioned at equidistant locations) around the axis line (axis line L1) of the sun gear 3. Each of the plurality of planetary gears 3 is also the double helical gear. Each of the plurality of planetary gears 3 includes a pair of rows of external teeth 3a forming the double helical gear teeth (opposed helix angle gear teeth). The pair of rows of external teeth 3a of each of the plurality of planetary gears 3 are in mesh with the pair of external teeth 2a of the sun gear 2. Note that FIG. 1 shows that only a part of the external teeth 2a and the external teeth 3a, are indicated by reference symbols, for easier illustration. The same applies to other constituents each of which is plural in number (e.g., internal teeth 4a, fastening holes 8a, discharge passages 26, etc., which will be described later) included in the planetary gear device 1. The ring gear 4 is disposed outside the five planetary gears 3 to surround the five planetary gears 3 arranged inward of the ring gear 4.

Figure 2:
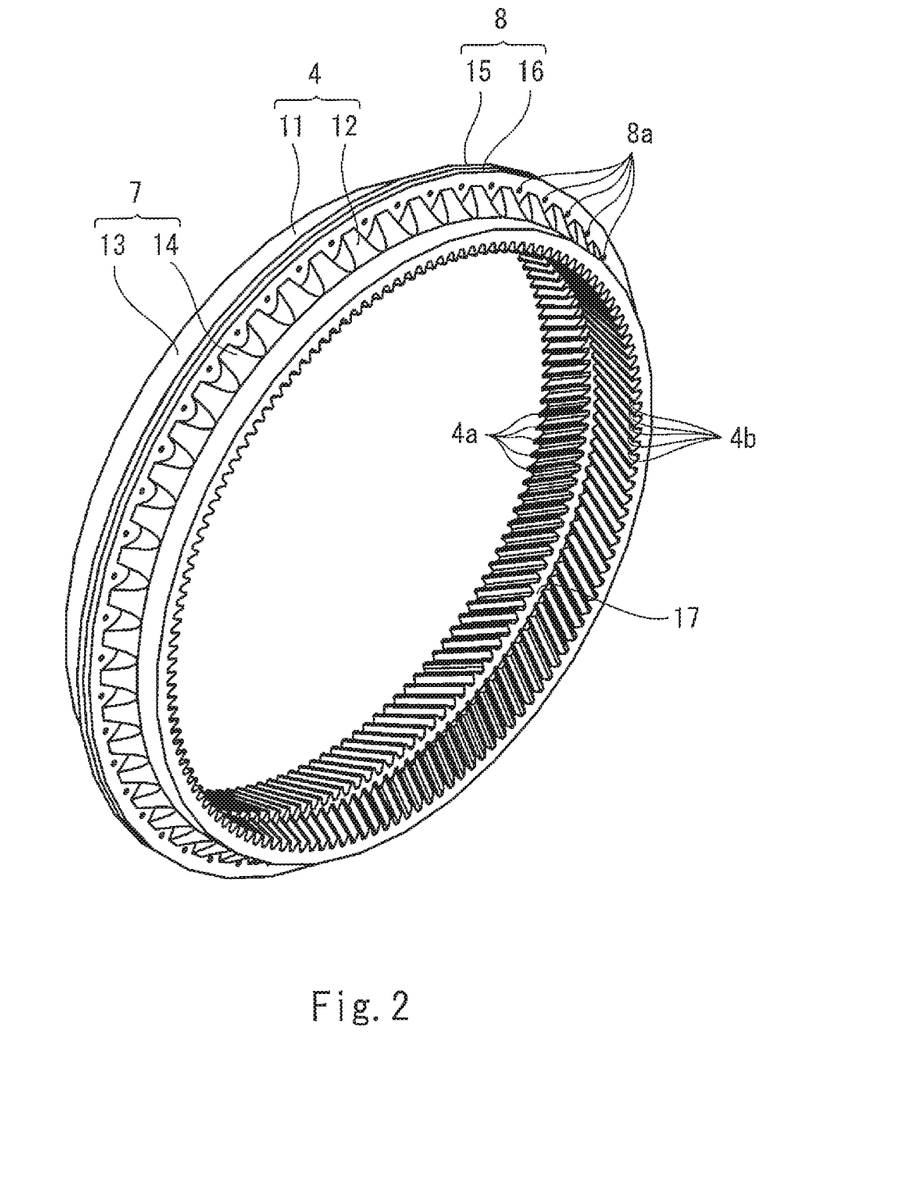
FIG. 2 is a perspective view showing a ring gear included in the planetary gear device of FIG. 1.

As shown in FIG. 2, the ring gear 4 includes a pair of helical gears 11, 12. The helical gear 11 includes the row of internal teeth 4a. The helical gear 12 includes the row of internal teeth 4b. The internal teeth 4a and the internal teeth 4b extend in different directions (in a mirror symmetry configuration in the present embodiment). The helical gears 11, 12 are butted to each other to form the ring gear 4. In brief, the ring gear 4 is configured as the double helical gear. More specifically, the helical gear 11 includes a rim 13 and a flange 15, while the helical gear 12 includes a rim 14 and a flange 16. In the present embodiment, the pair of helical gears 11, 12 are provided in the mirror symmetry configuration. Hereinafter, the configuration of the helical gear 11 will be basically described. Regarding the helical gear 12, description of the helical gear 11 will be referred to. Alternatively, the pair of helical gears 11, 12 need not be provided in the mirror symmetry configuration. The two helical gears 11, 12 may be disposed in a state in which the teeth of the gear 11 and the teeth of the gear 12 are out-of-phase. Or, the rims 13, 14 which will be described later may have different shapes.

The rim 13 which is a body of the helical gear 11 has a ring shape. A number of (a large quantity of) internal teeth 4a are formed at the inner peripheral surface of the rim 13 to be spaced apart from each other in a circumferential direction. The internal teeth 4a are parallel to each other. The internal teeth 4a are inclined (slanted) with respect to the axis line L1 of the ring gear 4. The row of the internal teeth 4a is formed at the inner peripheral surface of the rim 13. The rim 13 is provided with the flange 15 at an outer peripheral surface of a first end portion in the axial direction. The flange 15 protrudes radially outward from the outer peripheral surface of the rim 13. The flange 15 extends over the entire periphery of the rim 13 in the circumferential direction, at the outer peripheral surface of the rim 13.

In the pair of helical gears 11, 12, the rims 13, 14 are butted to each other, and the flanges 15, 16 are butted to each other. In this way, the ring gear 4 including the rim 7 and the flange 8 is constructed. The ring gear 4 with the above-described configuration is formed with a plurality of fastening holes 8a in the flange 8. The plurality of fastening holes 8a axially penetrate the flange 8. Each of the plurality of fastening holes 8a is formed between, for example, two adjacent discharge passages 26 (described later). A plurality of fastening members 10 are inserted into the plurality of fastening holes 8a, respectively. By the plurality of fastening members (e.g., bolts) 10, the ring gear 4 is fastened to a casing 9 of the driving force transmission mechanism.

In the ring gear 4 fastened as described above, the internal teeth 4a, 4b of the pair of helical gears 11, 12 are arranged to form the rows extending in the circumferential direction so that the internal teeth 4a, 4b extend in different directions (in the mirror symmetry configuration in the present embodiment). In this way, the ring gear 4 of the double helical type is constructed. The internal teeth 4a, 4b arranged as described above are in mesh with the external teeth 3a of the planetary gears 3.

The rows of the teeth 4a, 4b are disposed with a gap (clearance) formed between them in the direction of the axis line. An annular groove 17 of FIG. 1 is formed in this gap. Specifically, the annular groove 17 is formed in a region between the rows of the teeth 4a, 4b, at the inner peripheral surface of the ring gear 4. The annular groove 17 extends over the entire periphery in the circumferential direction, at the inner peripheral surface of the ring gear 4. The annular groove 17 is depressed in a radially outward direction, at the inner peripheral surface of the ring gear 4. The ring gear 4 is provided with the plurality of discharge passages 26 as will be described later. Inlets 31 of the plurality of discharge passages 26 open in the annular groove 17.

In the planetary gear device 1 with the above-described configuration, when the rotation force is input to the input shaft 5, the sun gear 2 rotates. According to the rotation of the sun gear 2, the plurality of planetary gears 3 rotate (revolve) around the sun gear 2 while rotating around the axes of the planetary gears 3. Thus, the planetary carrier 6 on which the planetary gears 3 are mounted rotates to a first side (one side) in the circumferential direction around the axis line L1. The rotation force can be output from the planetary carrier 6.

Figure 3:
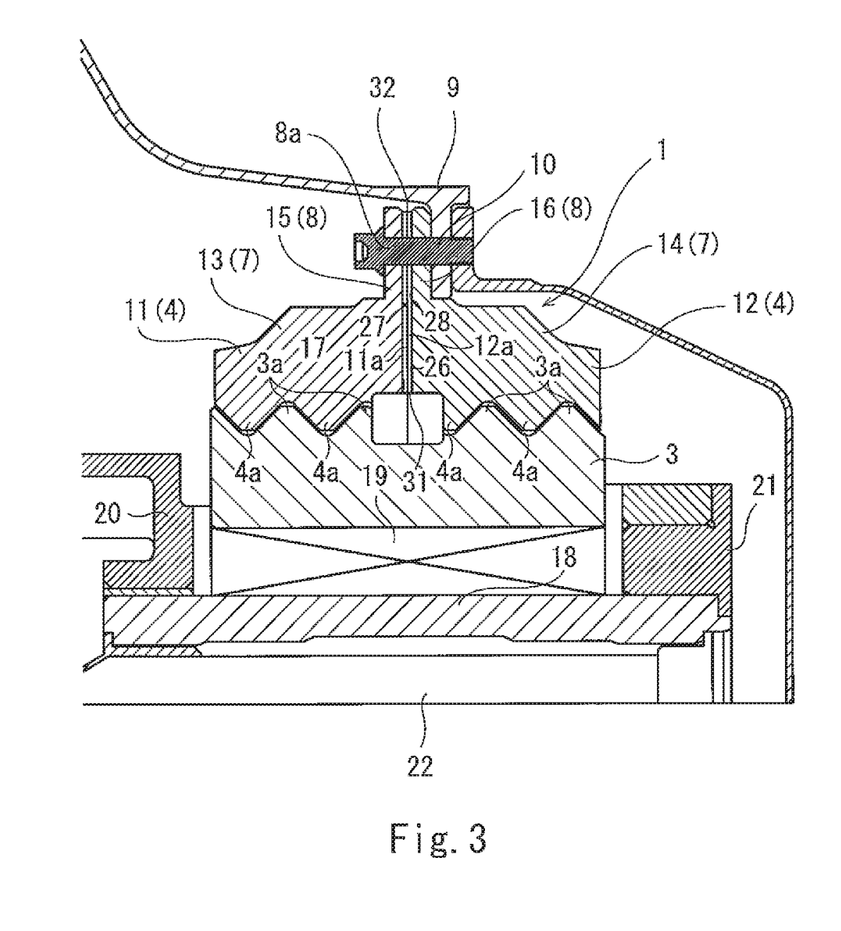
FIG. 3 is a cross-sectional view showing the planetary gear device of FIG. 1, which is partially cut and enlarged.

The planetary carrier 6 with the above-described function has a ring shape in a front view which is viewed in the direction of the axis line. As shown in FIG. 3, the planetary carrier 6 includes a pair of plates 20, 21, and a plurality of fixed support shafts 22. The pair of plates 20, 21 are ring-shaped plate members. The pair of plates 20, 21 are disposed on a first side (one side) and a second side (the other side), respectively, in the direction of the axis line of the planetary gears 3. Between the pair of plates 20, 21, the plurality of (five corresponding to the number of the planetary gears 3 in the present embodiment) fixed support shafts 22 are provided to connect the pair of plates 20, 21 to each other. Planetary shafts 18 are rotatably externally fitted to the fixed support shafts 22. The planetary gears 3 are externally fitted to the planetary shafts 18 via bearings 19. In the above-described manner, each of the planetary gears 3 is mounted on the planetary carrier 6 so that the planetary gear 3 is rotatable around its axis line L2. The input shaft 5 is inserted into the inner holes of the pair of plates 20, 21. The planetary carrier 6 is rotatable relative to the input shaft 5. The planetary carrier 6 is rotatable around the sun gear 2 together with the planetary gears 3. The planetary carrier 6 includes baffle units 23 each disposed in a region which is between two adjacent planetary gears 3 and between the sun gear 3 and the ring gear 4.

Figure 4:
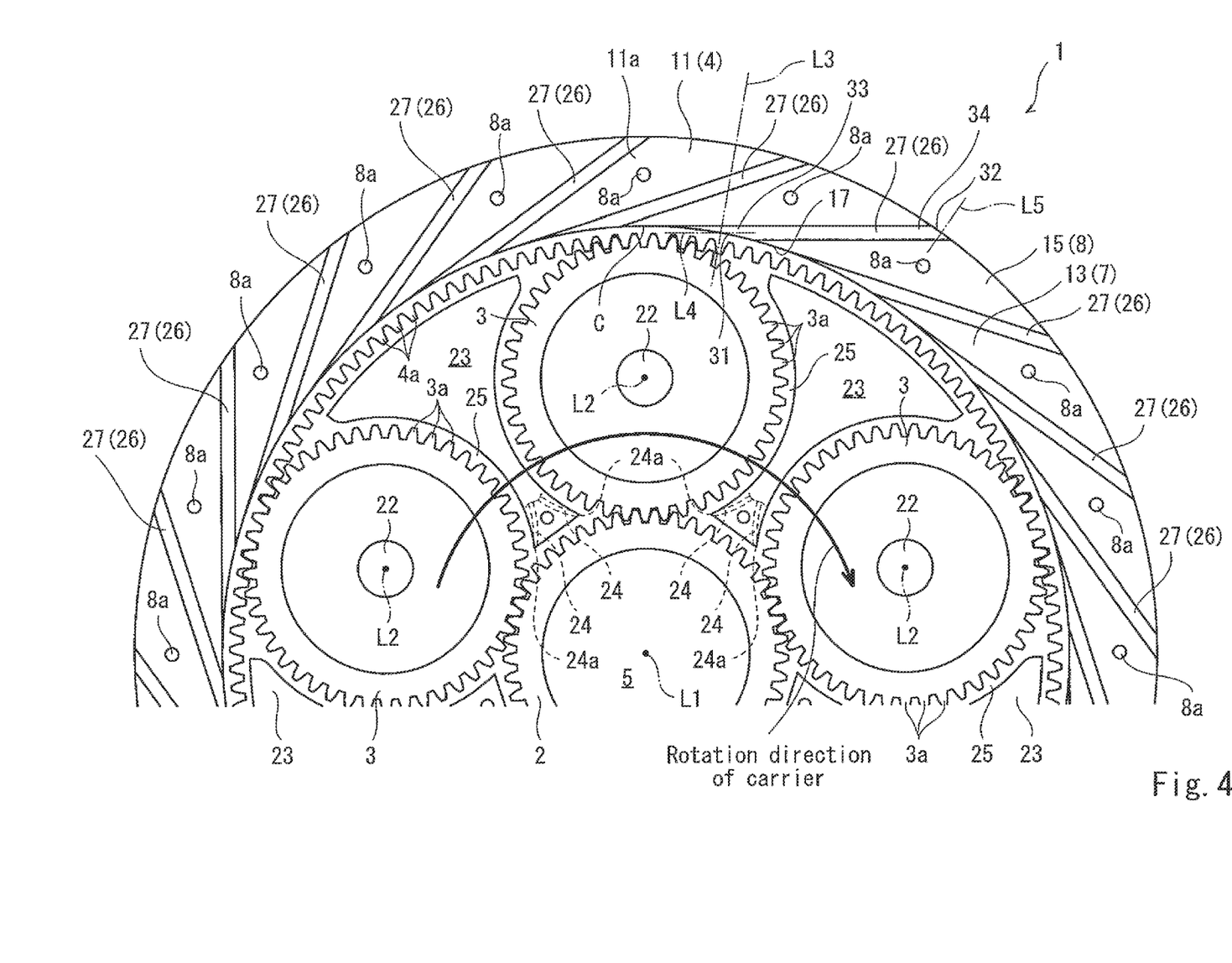
FIG. 4 is a partially enlarged cross-sectional view showing the planetary gear device of FIG. 1.

Each of the baffle units 23 has the same shape as that of the above-described region in a front view. Specifically, in each of the baffle units 23, both side surfaces in the radial direction have a circular-arc shape, and both side surfaces in the circumferential direction have a circular-arc shape depressed (recessed) in an inward direction. The both side surfaces in the circumferential direction have the circular-arc shape conforming to the shape of two adjacent planetary gears 3. Each of the planetary gears 3 is disposed between two adjacent baffle units 23. As shown in FIG. 4, each of the baffle units 23 with such a shape is formed with at least one oil feeding passage (two oil feeding passages in the present embodiment) 24.

The oil feeding passages 24 are formed at the radially inner region of each of the baffle units 23. The oil feeding passages 24 include feeding ports 24a, respectively. In the present embodiment, the feeding ports 24a of the oil feeding passages 24 face the first side and the second side of each of the baffle units 23 in the circumferential direction. The feeding ports 24a need not face in the above-described directions and may face in other directions.

The oil feeding passages 24 will be described in more detail. The feeding ports 24a of the oil feeding passages 24 face mesh portions, respectively, between the sun gear 2 and two adjacent planetary gears 3 located on the first side and the second side in the circumferential direction. Alternatively, the feeding ports 24a of the oil feeding passages 24 may face only one of the first side and the second side of the baffle unit 23 in the circumferential direction. The oil feeding passages 24 are connected to a supply source of the lubricating oil provided outside the planetary gear device 1, for example, a tank. The lubricating oil reserved in the supply source is led to the oil feeding passages 24. The lubricating oil led to the oil feeding passages 24 is injected to the mesh portions between the planetary gears 3 and the sun gear 2, from the feeding ports 24a of the oil feeding passages 24. The injected lubricating oil lubricates the mesh portions and then reaches the ring gear 4 according to the rotation of the planetary gears 3. After that, the lubricating oil flows into the annular groove 17 formed between the pair of internal teeth 4a, 4b.

The ring gear 4 is provided with the discharge passages 26 to discharge the lubricating oil flowing into the annular groove 17, to an outside region of the ring gear 4. It is sufficient that at least one discharge passage 26 is formed at the ring gear 4. One or a plurality of discharge passages 26 may be formed. In a case where the plurality of discharge passages 26 are formed, the plurality of discharge passages 26 may have the same shape or different shapes, as will be described later. Further, all of the plurality of discharge passages 26 need not have the same shape. The discharge passages 26 with different shapes may be included in the plurality of discharge passages 26 and formed at the ring gear 4. In the present embodiment, all of the plurality of discharge passages 26 have the same shape.

Each of the discharge passages 26 is comprised of two oil discharge grooves 27, 28. As shown in FIG. 3, the two oil discharge grooves 27, 28 are formed at butted surface 11a, 12a, respectively, of the pair of helical gears 11, 12. Therefore, in a state in which the pair of helical gears 11, 12 are butted to each other, the two oil discharge grooves 27, 28 are joined to each other to form the discharge passage 26. Since the discharge passage 26 is formed in this way, the discharge passage 26 can be designed more flexibly. Each of the oil discharge grooves 27, 28 may have a passage cross-section with a semi-oval shape. The passage cross-section of the discharge passage 26 formed by joining the oil discharge grooves 27, 28 has an oval shape. This makes it possible to suppress an increase in the thickness of the rim 7 and the thickness of the flange 8 of the ring gear 4.

Each of the discharge passages 26 penetrates the rim 7 of the ring gear 4. In the present embodiment, the discharge passage 26 also penetrates the flange 8. The discharge passage 26 includes the inlet 31 at the inner peripheral surface of the ring gear 4 and an outlet 32 at the outer peripheral surface of the ring gear 4. The inlet 31 is connected to the annular groove 17. The discharge passage 26 is configured to take in the lubricating oil flowing into the annular groove 17 from the inlet 31 and to discharge the lubricating oil from the outlet 32 to an outside region of the ring gear 4.

In the present embodiment, each of the discharge passages 26 has a linear (straight-line) shape. Each of the discharge passages 26 is inclined (tilted) to the first side (namely, revolution direction of the planetary gears 3) in the circumferential direction, with respect to a reference line L3 extending in the radial direction. In this structure, the discharge passage 26 includes an inlet-side portion 33 inclined to the first side in the circumferential direction, with respect to the reference line L3. The inlet-side portion 33 includes at least a portion closer to the inlet 31 of the discharge passage 26. The inlet-side portion 33 is formed at the ring gear 4 in a state in which the inlet-side portion 33 is inclined to the first side in the circumferential direction, with respect to the reference line L3. More specifically, a center line L4 of the inlet-side portion 33 is inclined to the first side in the circumferential direction, with respect to the reference line L3. Herein, the reference line L3 is defined as a line connecting an opening position of the inlet 31 (center position of the inlet 31) to the axis line L1 and extending in the radial direction, when the planetary gear device 1 is viewed in the direction of the axis line as shown in FIGS. 1 and 4.

Since the inlet-side portion 33 of the discharge passage 26 is inclined to the first side in the circumferential direction, the inlet 31 can face in a direction opposite to a direction (rotation direction of the planetary carrier 6) in which the lubricating oil flows through the annular groove 17. In other words, the inlet 31 of the discharge passage 26 can face the flowing lubricating oil. In this structure, even in a case where a centrifugal force or the like does not work on the lubricating oil flowing through the annular groove 17, the lubricating oil can be pushed into the inlet 31 by a force of the flowing lubricating oil. Thus, in the planetary gear device 1, more lubricating oil can be flowed into each of the discharge passages 26 and discharged to an outside region of the ring gear 4, compared to the conventional planetary gear device in which the discharge passages extend in the radial direction. This makes it possible to prevent a situation in which the lubricating oil is reserved in the annular groove 17 (inner peripheral surface of the ring gear 4). Therefore, it becomes possible to suppress an increase in the churning loss in the planetary gear device 1, and to further improve a function of suppressing the churning loss in the planetary gear device 1.

This will be more specifically described. The inlet 31 has an oval shape which is elongated in the circumferential direction. The inlet-side portion 33 extends to the first side in the circumferential direction. The inlet-side portion 33 extends in the same direction as the extension direction of a tangential line at a predetermined cross position C of the annular groove 17 of the ring gear 4 (position where the edge of the inlet 31 on the second side in the circumferential direction crosses the annular groove 17 of the ring gear 4 in a case where the planetary gear device 1 is seen in the direction of the axis line as shown in FIGS. 1 and 4). The same direction need not be perfectly same direction and includes a direction in which an angle is deviated within a range of ±15 degrees with respect to a reference direction, a reference line, or the like. The same applies to the "same direction" described below.

Since the inlet-side portion 33 is formed in the above-described manner, the inlet-side portion 33 is smoothly connected to the annular groove 17 at the above-described cross point. This allows the lubricating oil flowing along the annular groove 17 to directly flow to the inlet-side portion 33. Thus, in the planetary gear device 1, more lubricating oil can be flowed into each of the discharge passages 26, compared to the conventional planetary gear device in which the discharge passages extend straightly in the radial direction. This makes it possible to more effectively prevent a situation in which the lubricating oil is reserved in the annular groove 17.

The discharge passage 26, from the inlet 31 to the outlet 32, has a linear (straight-line) shape. The discharge passage 26 is inclined (tilted) to the first side in the circumferential direction, with respect to the reference line L3. In this structure, an outlet-side portion 34 of the discharge passage 26 which is closer to the outlet 32, is deviated to the first side in the circumferential direction, with respect to the inlet-side portion 33. The outlet-side portion 34 of the discharge passage 26 is formed at the ring gear 4 so that the outlet-side portion 34 is inclined (tilted) to the first side in the circumferential direction, with respect to a perpendicular line L5 (line connecting the opening position of the outlet 32 to the axis line L1 and extending in the radial direction) at the opening position of the outlet 32 in the outer peripheral surface of the ring gear 4.

By forming the outlet-side portion 34 of the discharge passage 26 so that the outlet-side portion 34 is inclined (tilted) to the first side in the circumferential direction, as described above, the following function can be performed. In a case where the planetary gear device 1 is used in the driving force transmission mechanism of the aircraft engine, a swirl flow swirling in the same direction as the rotation direction of the planetary carrier 6 is generated around the planetary gear device 1. In view of this, by causing the opening direction of the outlet 32 of the discharge passage 26 to face the first side in the circumferential direction with respect to the perpendicular line L5, the lubricating oil can be drawn out by the swirl flow. Thus, it becomes possible to discharge more lubricating oil to an outside region of the ring gear 4, compared to the conventional planetary gear device in which the discharge passages extend straightly in the radial direction.

Embodiment 2

Figure 5:
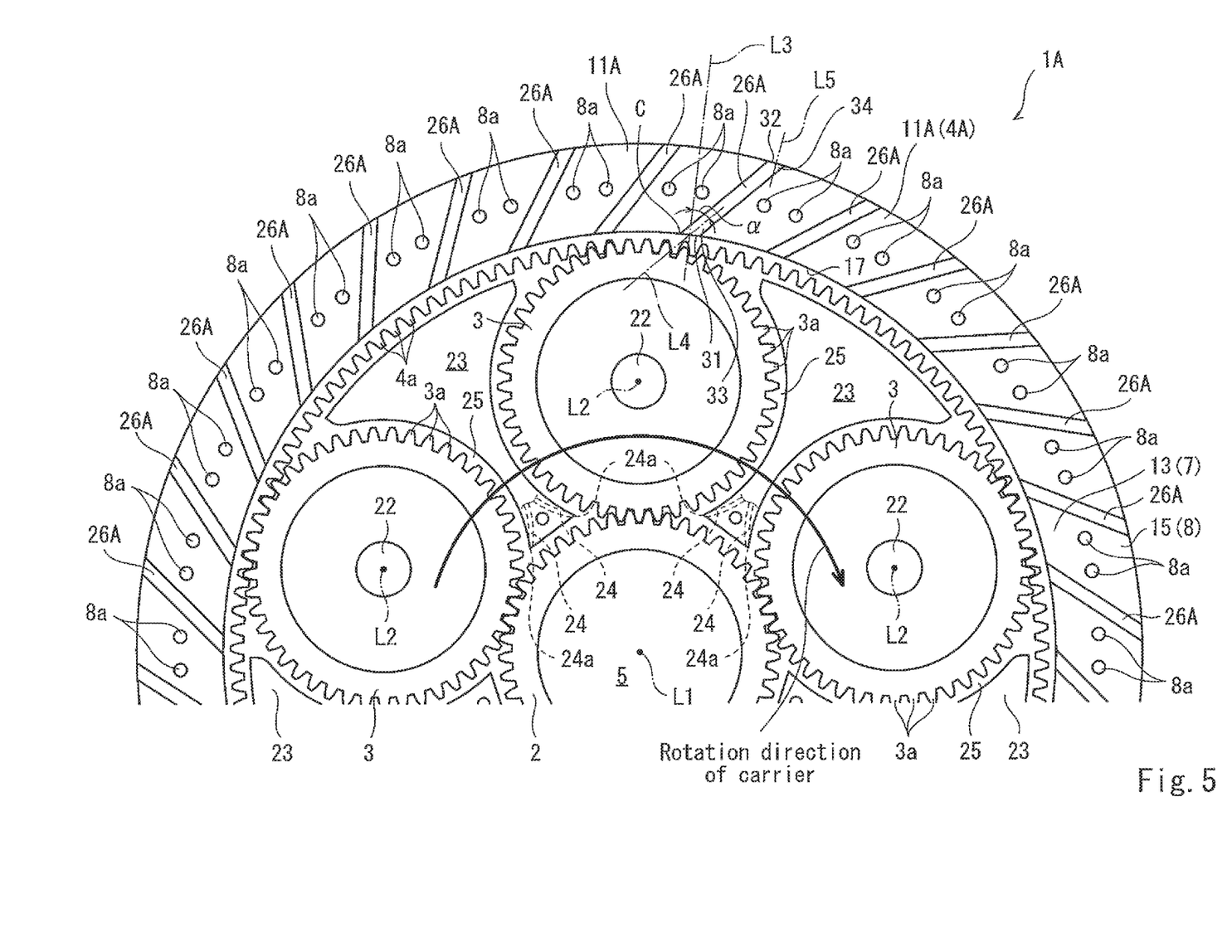
FIG. 5 is a cross-sectional view of a planetary gear device according to Embodiment 2 of the present invention, which is viewed in the direction of the axis line.

A planetary gear device 1A according to Embodiment 2 has a configuration similar to that of the planetary gear device 1 according to Embodiment 1. Therefore, regarding the configuration of the planetary gear device 1A according to Embodiment 2, differences from the configuration of the planetary gear device 1 according to Embodiment 1 will be mainly described. In Embodiment 2, the same constituents as those of Embodiment 1 are designated by the same reference symbols and will not be described in repetition. The same applies to a planetary gear device according to Embodiment 3.

In the planetary gear device 1A according to Embodiment 2, a ring gear 4A is provided with a plurality of discharge passages 26A. As in the discharge passages 26 of Embodiment 1, the discharge passages 26A are inclined (tilted) to the first side in the circumferential direction, with respect to the reference line L3. However, an angle α at which the discharge passages 26A are inclined with respect to the reference line L3 is smaller than that of the planetary gear device 1 according to Embodiment 1.

As described above, the angle α of each of the plurality of discharge passages 26A is set to smaller one in a case where the plurality of discharge passages 26A are formed at the ring gear 4A. This makes it possible to increase the number of discharge passages 26A while increasing the space formed between the two adjacent discharge passages 26A at the butted surface 11a of the helical gear 11A, compared to the configuration of Embodiment 1 in which the angle of each of the discharge passages 26 is set to larger one. In this configuration, the number of fastening holes 8a formed between the two adjacent discharge passages 26A can be increased. In other words, the number of fastening members 10 disposed between the two adjacent discharge passages 26A can be increased. As a result, a force for fastening the planetary gear device 1A to the casing 9 can be increased.

In the planetary gear device 1A, by setting the angle α of each of the plurality of discharge passages 26A to smaller one, the length of each of the discharge passages 26A can be reduced. This allows a passage resistance of each of the discharge passages 26A to be lower than that of the discharge passage 26 of Embodiment 1. Thus, it becomes possible to suppress reduction of a flow velocity of the lubricating oil flowing through the discharge passage 26A. As a result, more lubricating oil can be discharged to an outside region of the ring gear 4 through the discharge passages 26A.

It is sufficient that the angle α formed between the discharge passage 26A and the reference line L3 is, for example, 30 degrees or larger and 90 degrees or smaller (between 30 degrees and 90 degrees). By setting the angle α to smaller one, the length of each of the discharge passages 26A can be reduced, and the passage resistance can be reduced. In contrast, by setting the angle α to larger one, the lubricating oil can be easily led to the discharge passages 26A as in the discharge passages 26 of Embodiment 1.

The planetary gear device 1 according to Embodiment 2 can achieve functions and advantages similar to those of the planetary gear device 1 according to Embodiment 1.

Embodiment 3

Figure 6:
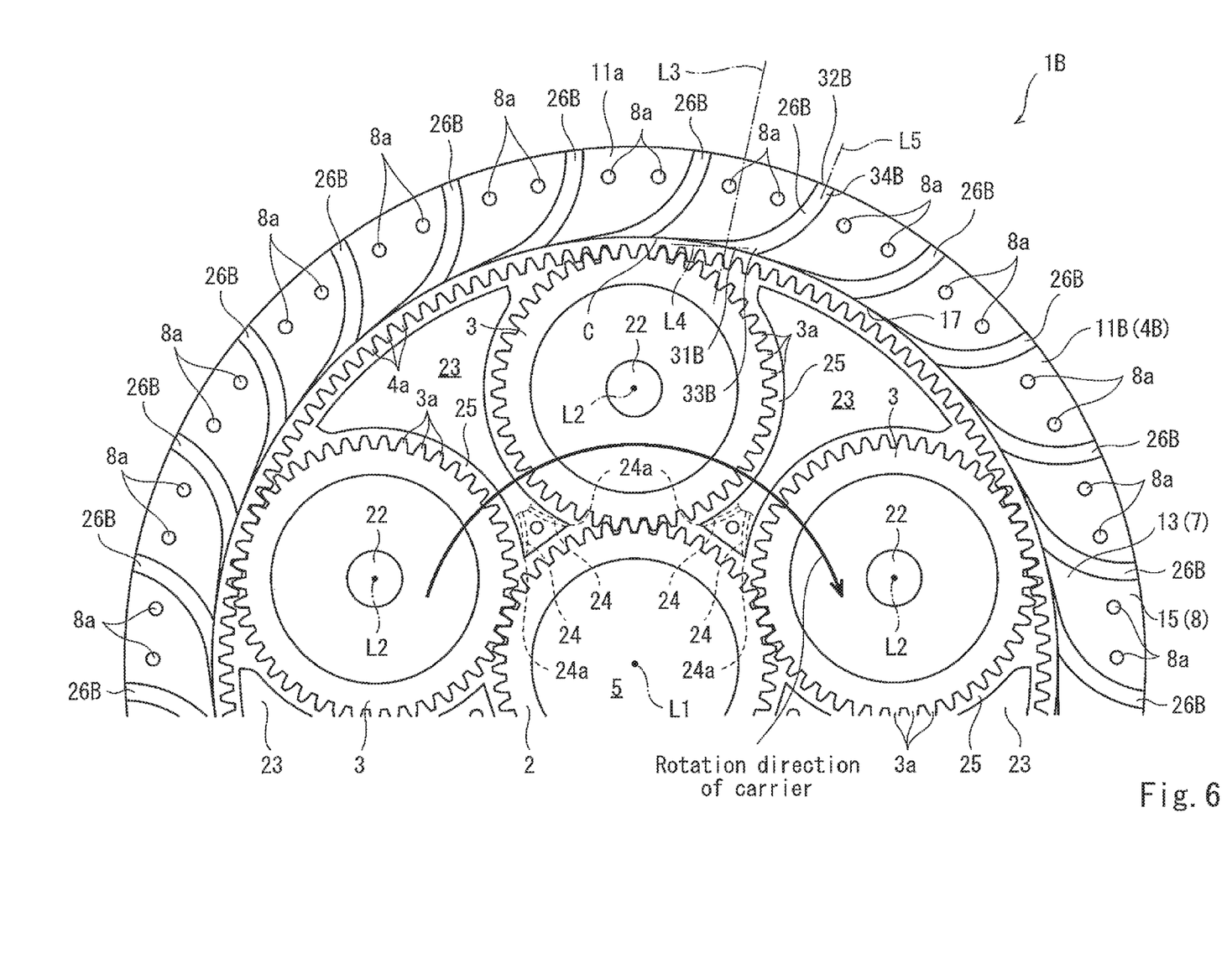
FIG. 6 is a cross-sectional view of a planetary gear device according to Embodiment 3 of the present invention, which is viewed in the direction of the axis line.

In a planetary gear device 1B according to Embodiment 3, a ring gear 4B is provided with a plurality of discharge passages 26B. Each of the plurality of discharge passages 26B includes an inlet 31B and an outlet 32B. As in the inlet-side portion 33 of Embodiment 1, an inlet-side portion 33B of each of the discharge passages 26B is formed at the ring gear 4B in a state in which the second side in the circumferential direction of the inlet-side portion 33B is inclined with respect to the reference line L3. More specifically, the inlet-side portion 33B extends in the same direction as the extension direction of a tangential line at a cross position C in the inner peripheral surface of the ring gear 4B.

In contrast, an outlet-side portion 34B extends in the same direction as that of the perpendicular line L5. Thus, in each of the discharge passages 26B, there is a difference of about 90 degrees between the extension direction of the inlet-side portion 33B and the extension direction of the outlet-side portion 34B. A passage portion of the discharge passage 26B, connecting the inlet-side portion 33B to the outlet-side portion 34B is curved. In the present embodiment, for example, the passage portion of the discharge passage 26B is curved in a circular-arc shape.

In the planetary gear device 1B with the above-described configuration in which the ring gear 4B is provided with the plurality of discharge passages 26B, the space formed between the two adjacent discharge passages 26B can be ensured as in the discharge passages 26A of Embodiment 2. Also, the number of the discharge passages 26B can be set to be larger than that in the planetary gear device 1 of Embodiment 1. In this way, the number of fastening holes 8a formed in the flange 8 of the ring gear 4B can be increased. As a result, a force for fastening the planetary gear device 1B to the casing 9 can be increased.

In the planetary gear device 1B, by curving each of the discharge passages 26B, the length of the discharge passage 26B can be made smaller than that of the discharge passage 26 of Embodiment 1. This allows a passage resistance of the discharge passage 26B to be lower than that of the discharge passage 26 of Embodiment 1.

As in the discharge passages 26 of Embodiment 1, in the planetary gear device 1B, the extension direction of the inlet-side portion 33B conforms to the tangential direction of the inner peripheral surface of the ring gear 4B. This allows the lubricating oil to more easily flow into the inlet 31B than into the inlet of the conventional planetary gear device. The inlet 31B allows more lubricating oil to be flowed into each of the discharge passages 26B than the inlet of the conventional planetary gear device. As a result, it becomes possible to prevent a situation in which the lubricating oil is reserved in the annular groove 17.

The planetary gear device 1 according to Embodiment 3 can achieve functions and advantages similar to those of the planetary gear device 1 according to Embodiment 1.

Other Embodiment

Although in the planetary gear devices 1, 1A, 1B of Embodiment 1, Embodiment 2, and Embodiment 3, all of the discharge passages 26 have the same shape, all of the discharge passages 26A have the same shape, and all of the discharge passages 26B have the same shape, this configuration is merely exemplary. Specifically, a combination of the discharge passages 26, 26A, 26B with different shapes may be formed at the ring gear 4. For example, the discharge passage 26A of Embodiment 2 and the discharge passage 26B of Embodiment 3 may be alternately arranged at the ring gear 4. Three kinds of discharge passages 26, 26A, 26B may be disposed in turn at the ring gear 4. The shape of the passage portion of each of the discharge passages 26, 26A, 26B is not limited to the straight line or the circular-arc, and may be a S-shape or a right angle. For example, in the case of the passage portion with the S-shape, the inlet-side portion of the discharge passage may extend in the same direction as the tangential direction of the inner peripheral surface of the ring gear 4, and the outlet-side portion of the discharge passage may face in the circumferential direction of the ring gear 4. Further, each of the discharge passages 26, 26A, 26B need not extend along the butted surfaces 11a, 12b. Instead, each of the discharge passages 26, 26A, 26B may be inclined with respect to the butted surfaces 11a, 12b. Moreover, although each of the ring gears 4, 4A, 4B is formed by butting the pair of helical gears 11, 12 to each other, each of the ring gears 4, 4A, 4B may be comprised of a single member. Thus, the structure of each of the ring gears 4, 4A, 4B is not limited.

The passage cross-section of each of the discharge passages 26, 26A, 26B need not be the oval shape, and may be a circular shape or a polygonal shape. The passage cross-section of each of the discharge passages 26, 26A, 26B need not be the same over the entire passage. For example, each of the discharge passages 26, 26A, 26B may have a taper shape so that the cross-section of each of the inlets 31, 31A, 31B is larger than that of the corresponding one of the outlets 32, 32A, 32B. Or, each of the discharge passages 26, 26A, 26B may have a taper shape so that the cross-section of each of the inlets 31, 31A, 31B is smaller than that of the corresponding one of the outlets 32, 32A, 32B.

Although in the planetary gear devices 1, 1A, 1B of Embodiment 1, Embodiment 2 and Embodiment 3, the pair of oil feeding passages 24 are disposed to correspond to the mesh portions, respectively, between the planetary gears 3 and the sun gear 2, the number of the oil feeding passages 24 is not limited to this. For example, only at least one oil feeding passage 24 may be provided to correspond to the planetary gears 3. Or, one oil feeding passage 24 may be provided for each of the planetary gears 3.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention. For example, the frame upper cover part and the dash cover part may not be separate members. In the present invention, the frame upper cover part may include the dash cover part.

REFERENCE SIGNS LIST 1, 1A, 1B planetary gear device
2 sun gear
2a external teeth
3 planetary gear
3a external teeth
4, 4A, 4B ring gear
4a, 4b internal teeth
6 planetary carrier
8 flange
9 casing
10 fastening member
11, 12 helical gear
11a, 12b butted surface (joined surface)
24 oil feeding passage
26, 26A, 26B discharge passage
27, 28 oil discharge groove
31, 31B inlet
32, 32B outlet
33, 33B inlet-side portion
34, 34B outlet-side portion

The invention claimed is:

1. A planetary gear device comprising:
a sun gear having a row of external teeth;
a plurality of planetary gears disposed around the sun gear, each of the plurality of planetary gears having a row of external teeth which mesh with the external teeth of the sun gear;
a planetary carrier at which the plurality of planetary gears are rotatably provided, the planetary carrier being rotatable around the sun gear together with the plurality of planetary gears; and
a ring gear having a pair of rows of internal teeth which mesh with the external teeth of the plurality of planetary gears, the plurality of planetary gears being arranged inward of the ring gear,
wherein the planetary carrier includes an oil feeding passage which feeds lubricating oil to at least one of the plurality of planetary gears,
wherein the ring gear is a double helical gear in which the pair of rows of internal teeth are arranged in a direction of an axis line of the ring gear and the internal teeth of one of the rows and the internal teeth of the other of the rows are inclined in different directions, the ring gear including at least one discharge passage,
wherein the at least one discharge passage includes an inlet-side portion and an outlet-side portion, the inlet-side portion being closer to an inlet configured to open in a region between the pair of rows of internal teeth at an inner peripheral surface of the ring gear, and the outlet-side portion being closer to an outlet configured to open in a region of an outer peripheral surface of the ring gear, and wherein the inlet-side portion is formed at the ring gear so that the inlet-side portion is inclined in a forward rotation direction of the planetary carrier, with respect to a reference line extending in a radial direction of the ring gear.

2. The planetary gear device according to claim 1, wherein the inlet-side portion extends in the same direction as a tangential direction of the inner peripheral surface of the ring gear.

3. The planetary gear device according to claim 1, wherein the outlet-side portion is formed at the ring gear so that the outlet-side portion is inclined to a first side in a circumferential direction of the ring gear, with respect to the reference line extending in the radial direction of the ring gear.

4. The planetary gear device according to claim 1, wherein the at least one discharge passage is formed in a curved shape at the ring gear.

5. The planetary gear device according to claim 4, wherein the at least one discharge passage includes a plurality of discharge passages, wherein the ring gear includes a flange formed over an entire periphery in a circumferential direction, the flange protruding radially outward, wherein the flange is fastened to a casing by a plurality of fastening members, wherein the plurality of discharge passages are formed at the flange so that the plurality of discharge passages are spaced apart from each other, and wherein each of the plurality of fastening members is provided between two adjacent discharge passages.

6. The planetary gear device according to claim 1, wherein the ring gear includes a pair of helical gears including the pair of rows of internal teeth, wherein the pair of helical gears include joined surfaces which are joined to each other to form the ring gear, and discharge grooves facing each other are formed at the joined surfaces, respectively, and wherein the at least one discharge passage is formed by butting the discharge grooves to each other.

7. The planetary gear device according to claim 1, wherein the inlet of the discharge passage faces in a direction opposite to the forward direction of the planetary carrier.

* * * * *